Aug. 24, 1965  W. H. KRAUSE  3,201,972
KNOCK DETECTION INSTRUMENT
Filed March 15, 1962  2 Sheets-Sheet 1

INVENTOR.
WARREN H. KRAUSE
BY
Schramm, Kramer & Sturges
ATTORNEYS

INVENTOR.
WARREN H. KRAUSE
BY
ATTORNEYS

United States Patent Office 3,201,972
Patented Aug. 24, 1965

3,201,972
KNOCK DETECTION INSTRUMENT
Warren H. Krause, Cleveland, Ohio, assignor to The Standard Oil Company, Cleveland, Ohio, a corporation of Ohio
Filed Mar. 15, 1962, Ser. No. 179,877
1 Claim. (Cl. 73—35)

This invention relates to indication of detonation and pressure impulses and particularly to the measurement of the anti-knock qualities of gasoline and other fuels for internal combustion engines.

Fuels for internal combustion engines vary in their tendency to produce knock or detonation. Some quick burning fuels produce an audible noise or ping which is not only disturbing but indicative of a pressure condition in the engine cylinder which is injurious to the engine. Some pressure indicators have been proposed for estimating differences in antiknock qualities of engine fuels by attempting to determine the value of the peak pressure.

The present invention relates to an indicator which responds more directly to the pressure conditions indicative of the phenomenon known as detonation or engine knocking.

In carrying out the invention in accordance with a preferred form thereof, a crystal-type pressure indicator is connected to the engine cylinder and a band pass filter is employed for eliminating the low frequency components of pressure variations so as to pass only the components of frequency responsible for the audio noise of spark knock. A detector or demodulator is connected to the output of the filter to form pulses. The number of pulses of a predetermined level recorded in a given period of engine operation are then indicative of the antiknock quality of the gasoline.

A better understanding of the invention will be afforded by the following detailed description considered in conjunction with the accompanying drawing, in which.

Figure 1:
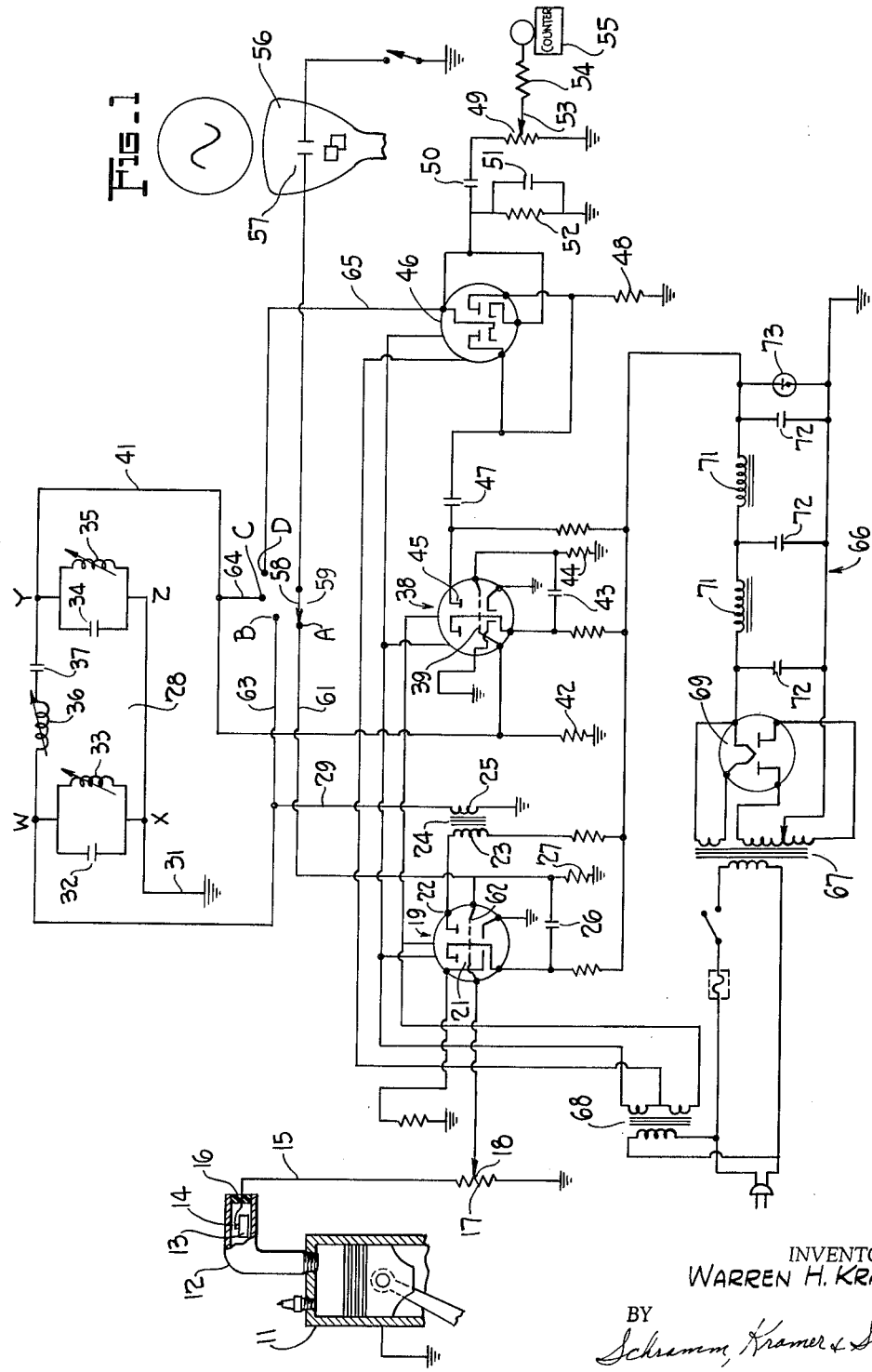
FIG. 1 is a circuit diagram of an embodiment of the invention.

In the circuit diagram of FIG. 1, an internal combustion engine used for testing antiknock qualities of fuels is represented schematically by a diagrammatic indication of a single engine cylinder 11 with a pressure connection 12 thereto containing a piezoelectric crystal 13 to serve as a pressure transducer. The piezoelectric crystal may be of the conventional quartz crystal type having two plates between which the electrical potential varies in response to variations in the pressure applied to the plates to compress the crystal. Since one side of the circuit may be grounded, the piezoelectric crystal 13 is shown as cemented and grounded on one surface to a side of the pressure connection 12 with the opposite ungrounded surface or plate electrically connected to a terminal 14 from which a conductor 15 is brought through an insulating plug 16.

The output lead 15 of the crystal pickup 13 is connected to a potentiometer resistor 17 grounded at the opposite end and having a movable tap 18 so as to serve as a volume control.

An amplifier 19 is provided, shown as a twin triode vacuum tube. Although the invention is not limited to the use of a particular vacuum tube, the type 12AU7 has been found satisfactory. As shown, the tap 18 is connected directly to the grid 21 of the first stage triode of the amplifier 19 and the plate 22 of the second stage triode is connected to the primary winding 23 of an iron core transformer 24 having a secondary winding 25. The triode stages are resistance-capacity coupled by means of a condenser 26 which may be of the order of 1.5 microfarads and a grid leak resistor 27 which may be of the order of 1 megohm.

Preferably, the circuit is so designed that the crystal pickup 13 acts substantially as an indicator of the time rate of change of pressure in the cylinder 11 or the derivative of pressure with respect to time, $dP/dt$. In this manner a relatively economical circuit may be employed and a high degree of amplification may be avoided. Good response to high frequencies is obtained because of the high slope of the high frequency components which results in a large value of the rate of change of pressure with respect to time.

The characteristics of the quartz crystal pickup 13 are such that when it feeds into very high impedance it provides a potential difference between the plates proportional to pressure, but when it feeds into a low impedance it provides a potential proportional to the rate of change of pressure with time. This I believe to be due to the capacitative effect of the crystal acting as a differentiator in conjunction with a low resistance shunt. On the other hand, the potentiometer 17 serving as a shunt for the crystal 13 should be of sufficient resistance to be capable of employment as a volume control. Accordingly, I have found a resistance of between 5 and 10 megohms for the potentiometer 17 to be a satisfactory comprise in that it serves as an effective volume control and still gives substantially differentiating effect of the output of the crystal 13.

The secondary winding 25 of the coupling transformer 24 is connected to the input terminals W and X of a band pass filter 28. One side of the secondary winding 25 is connected to the filter terminal W through a conductor 29 and the other side is grounded, the filter terminal X being grounded through a conductor 31.

The filter 28 is of the pi network type having a condenser 32 and an adjustable inductance 33 connected in parallel between the filter input terminals W and X, and having a condenser 34 and an adjustable inductance 35 connected in parallel between filter output terminals Y and Z, with serially connected adjustable inductance 36 and condenser 37 connected between the filter terminals W and Y.

The filter output terminals Y and Z are connected to the input terminals of a second amplifier 38 which may also be of the twin triode vacuum tube type such as a 12AU7 tube. The filter terminal Y is connected to the grid 39 of the first stage triode of the amplifier 38 through a conductor 41. The cathodes of the tube 38 are grounded and the filter terminal Z is connected to ground through conductor 31. A grid resistor 42 is also provided.

A second stage triode of the amplifier 38 is coupled to the first stage by the condenser 43, which may be of the order of 0.1 microfarad, and a 1 megohm grid resistor 44.

The anode 45 of the second stage triode of the amplifier 38 is coupled to a detector or demodulator 46 for converting the high frequency wave trains passed by the filter 28 into pulses. The detector 46 is coupled to the anode 45 by means of a condenser 47 having a capacity of the order of .04 microfarad, and a grounded resistor 48 having a resistance of the order of 47,000 ohms in series with the detector 46.

The detector 46 may take the form of a twin diode vacuum tube such as a 6AL5 tube, for example, having anodes connected in parallel to the junction of the condenser 47 and the resistor 48, and cathodes connected in parallel and coupled to an output volume control resistor 49.

For filtering out high frequency components from the output, a filter is connected to the cathodes of the detector 46, comprising condenser 51 having a capacity of the order of .25 microfarad shunted by a resistor 52 having a resistance of the order of 6,800 ohms, connected between the cathodes of the detector 46 and ground. Thus the filter 51–52 has an RC time constant of the order of 1700 ohm-microfarads. A relatively large condenser 50 having a capacity of the order of 4 microfarads is connected between the cathodes of the rectifier 46 and the volume control resistor 49 for coupling the detector output to the resistor 49 and passing relatively low frequency pulses.

The volume control resistor 49 is provided with an adjustable tap 53 connected through a resistor 54 to a pulse counter 55 such as electronic pulse counter of conventional type or any other suitable output measuring device.

For calibration purposes, preferably a cathode ray oscilloscope 56 is also provided having a deflection circuit 57 connected to the moveable contact 58 of a selector switch 59. The switch 59 has stationary contacts A, B, C and D connected, respectively, through a conductor 61 to the grid 62 of the second stage triode of the amplifier 19, through a conductor 63 to the input terminal W of the band pass filter 28, through a conductor 64 and the conductor 41 to the output terminal Y of the band pass filter 28, and through a conductor 65 to the cathodes of the detector 46.

A suitable regulated power supply 66 is provided for the vacuum tube amplifiers 19 and 38. The power supply 66, as shown, comprises a power transformer 67, a filament transformer 68, a biphase rectifier 69 of the vacuum tube type, series filter inductances 71, shunt filter condensers 72 and a regulating tube 73.

The detonation detection and measurement circuit illustrated is not limited to the measurement and testing of the operation of internal combustion engines or to the properties of internal combustion engine fuels. However, I have found that the audible noise of spark knock in an internal combustion engine and the frequency present in detonation which is injurious to internal combustion engines lies within the range between 6 and 8 kilocycles or approximately 7 kilocycles. Accordingly, when the apparatus is used for testing internal combustion engines and for determining antiknock properties or octane ratings of gasolines, the filter 28 is so designed as to act as a band pass filter passing signals varying around 7 kilocycles by plus or minus one kilocycle and to block all low frequency components effectively, especially components corresponding to the periodicity of explosions or spark timing.

Figure 2:
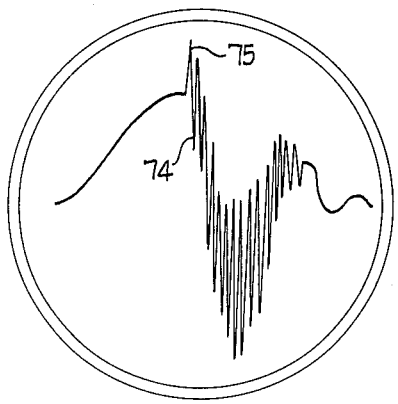
FIG. 2 is a graph illustrative of the variation with time of the rate of change of pressure with time in an internal combustion engine.

The instrument is then capable of detecting the intensity of spark knock or detonation emitted by gasoline burning internal combustion engines. Any crystal pickup capable of providing a signal proportional to the rate of change of pressure with respect to time, that is, $dP/dt$ v. time, may be used in this connection. A diagram of a typical oscilloscope trace taken from such a pickup is shown in FIG. 2. The curve of FIG. 2 is obtained by setting the oscilloscope switch 59 at position A. Under knocking conditions the first downward slope 74 of the curve of FIG. 2 contains a high frequency signal. As already pointed out the frequency of this signal ranges between 6 and 8 kilocycles per second.

The motivating energy used to provide a measurable signal is derived from the aforesaid high frequency component only and does not depend upon the magnitude of the peak signal at the point 75 of FIG. 2 as a primary source of signal. It is unnecessary to gate the signal represented by point 75 to a suitable level in order to provide the necessary calibration factors for knock intensity.

The parameters of the amplifiers 19 and 38 are such as to give class A amplification.

After class A amplification of the signal at the output of the amplifier 19 represented in FIG. 2, the signal is fed by means of the transformer coupling to the pi-network inductance-capacitance circuit filter section 28. This section removes all low frequency components, allowing only frequencies within the range of 6 to 8 kilocycles to pass through. The tuning of this filter section shown in FIG. 1 is accomplished in the following manner:

(1) The oscilloscope 56 is connected across the terminals W and X by setting the oscilloscope selector switch moveable contact 58 to the point B and a signal of 7 kilocycles from a suitable signal generator is fed to these terminals, the circuit 32–33 is then tuned as a trap circuit to provide a maximum voltage across the terminals W and X.

(2) The oscilloscope 56 is then connected across the terminals W and Y by temporary leads (not shown). The circuit 36–37 is tuned to provide minimum impedance, hence, minimum voltage across these terminals.

(3) The oscilloscope is finally connected across the terminals Y and Z by shifting the rotary switch plate 58 to the point C. The circuit 34–35 is then tuned to provide maximum voltage across the terminals Y and Z. When so tuned, this filter will act as a band pass filter passing signals varying around 7 kilocycles plus or minus one kilocycle, while blocking all low frequency components effectively. The inductances in the filter 28 for this purpose may be between 0.5 and 1.7 millihenries and the capacitances 1.5 microfarads.

Figure 3:
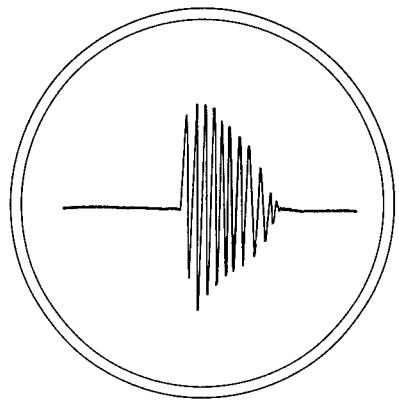
FIG. 3 is a graph representing the filtered output of the rate of change of pressure signals indicated in FIG. 2.

The wave form emitted by the filter 28 and appearing at the terminal Y is shown in FIG. 3. It is fed to the class A amplifier 38 after which it continues to the detector 46.

The detector 46 accomplishes half wave rectification followed by high frequency filtering to provide a pulsing output of one pulse per engine cycle. The pulses are counted in the electronic counter 55.

Figure 4:
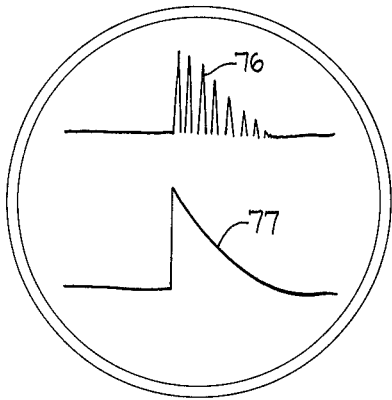
FIG. 4 is a graph of rectified signals and the filtered wave forms.

The wave form of FIG. 3 appears at the plate 45 of the amplifier 38 whereas the upper curve wave form 76 of FIG. 4 appears at the cathode of the detector 46. High frequency filtering results in the lower curve wave form 77 of FIG. 4 which appears at the output volume control 49.

In the normal operation of an Otto cycle engine, it has been found that there is a cyclic variation associated with the magnitude of this signal. For gasolines of higher octane number there will be less signals of high intensity, and for gasolines of lower octane number there will be more signals of high intensity emerging from the tap 53 of the output volume control.

In either case, the output will form a normal distribution of intensities about a mean which depends upon the antiknock value of the gasoline being burned. An illustration of this is given in FIG. 5. A higher count is obtained by the counter 55 for low octane gasolines than for high octane gasoline. In FIG. 1 the upper curve 78 represents a lower octane fuel and the lower cruve 79 represents a higher octane fuel.

Figure 5:
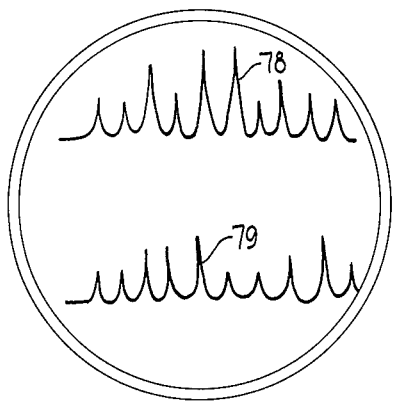
FIG. 5 is a graph representing the distributions of pulse height for two different fuels varying in octane value.

In FIG. 4 curve 76 represents the unfiltered output of the detector 46 whereas curve 77 represents the filtered output. In FIG. 5 curve 78 represents the distribution of pulse height for lower octane fuel and curve 79 represents the distribution for higher octane fuel. It will be understood that the time base for curves 78 and 79 of FIG. 5 has been contracted with respect to that of the curves of FIG. 4.

The spread in count between high octane and low octane gasoline is regulated by adjustment of the input volume control 17. On the other hand, the absolute level of the count may be set to and desired number by regulation of the output potentiometer 49 which, as shown, is a one megohm resistor so that the counter 55 responds to the pulses exceeding such selected absolute level.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

I claim:

A detonation indicator for an internal combustion engine having a cylinder, said indicator comprising in combination a piezoelectric pressure sensitive pickup exposed to the pressure within the cylinder of an internal combustion engine, a shunt having a resistance between 5 and 10 megohms connected across the pickup, a detector, a pi-network band pass filter interposed between the shunt and the detector, an amplifier interposed between the shunt and the filter, an amplifier interposed between the detector and the filter, a counter, a resistance-capacity filter having a time constant of the order of 1700 ohm-microfarads between the detector and the counter, the pi-network filter comprising input and output terminals with inductance and capacity elements in parallel across the input terminals and across the output terminals and inductance and capacity in series between input and output terminals, the electrical dimensions of the inductance and capacity elements being chosen to provide a band pass between 6 and 8 kilocycles.

References Cited by the Examiner

UNITED STATES PATENTS

| | | | |
|---|---|---|---|
| 2,337,522 | 12/43 | Eldredge | 73—35 |
| 2,340,714 | 2/44 | Traver et al. | 73—35 |
| 2,448,322 | 8/48 | Piety | 73—35 |
| 2,448,323 | 8/48 | De Boisblanc | 73—35 |

FOREIGN PATENTS 866,261　2/53　Germany.

RICHARD C. QUEISSER, *Primary Examiner*.